United States Patent [19]
Cheng

[11] Patent Number: 5,992,086
[45] Date of Patent: Nov. 30, 1999

[54] FISHING BOX

[76] Inventor: Jackson Cheng, 58, Ma Yuan West St., Taichung, Taiwan

[21] Appl. No.: 09/347,745

[22] Filed: Jul. 6, 1999

[51] Int. Cl.⁶ .................................................. A01K 97/05
[52] U.S. Cl. .................................................. 43/57
[58] Field of Search ........................... 206/315.11; 43/57, 43/55, 56

[56] References Cited

U.S. PATENT DOCUMENTS

| 299,765 | 6/1884 | Evans . | |
|---|---|---|---|
| 1,616,125 | 2/1927 | Holman . | |
| 3,606,511 | 9/1971 | Henning . | |
| 3,958,359 | 5/1976 | Doughty | 43/55 |
| 5,802,760 | 9/1998 | Campbell | 43/57 |

*Primary Examiner*—Jack W. Lavinder

[57] ABSTRACT

A fishing box has an outer casing, an inner casing disposed in the outer casing, a casket set having a hollow seat disposed on the inner casing receiving a plurality of caskets, a handle disposed on the hollow seat, an air inflation device disposed in the outer casing, an air channel, and a plurality of air inlet valves communicating with the air channel. The air channel is defined between a bottom plate of the inner casing and a bottom panel of the outer casing. The bottom plate of the inner casing has a plurality of through apertures receiving the air inlet valves.

2 Claims, 7 Drawing Sheets

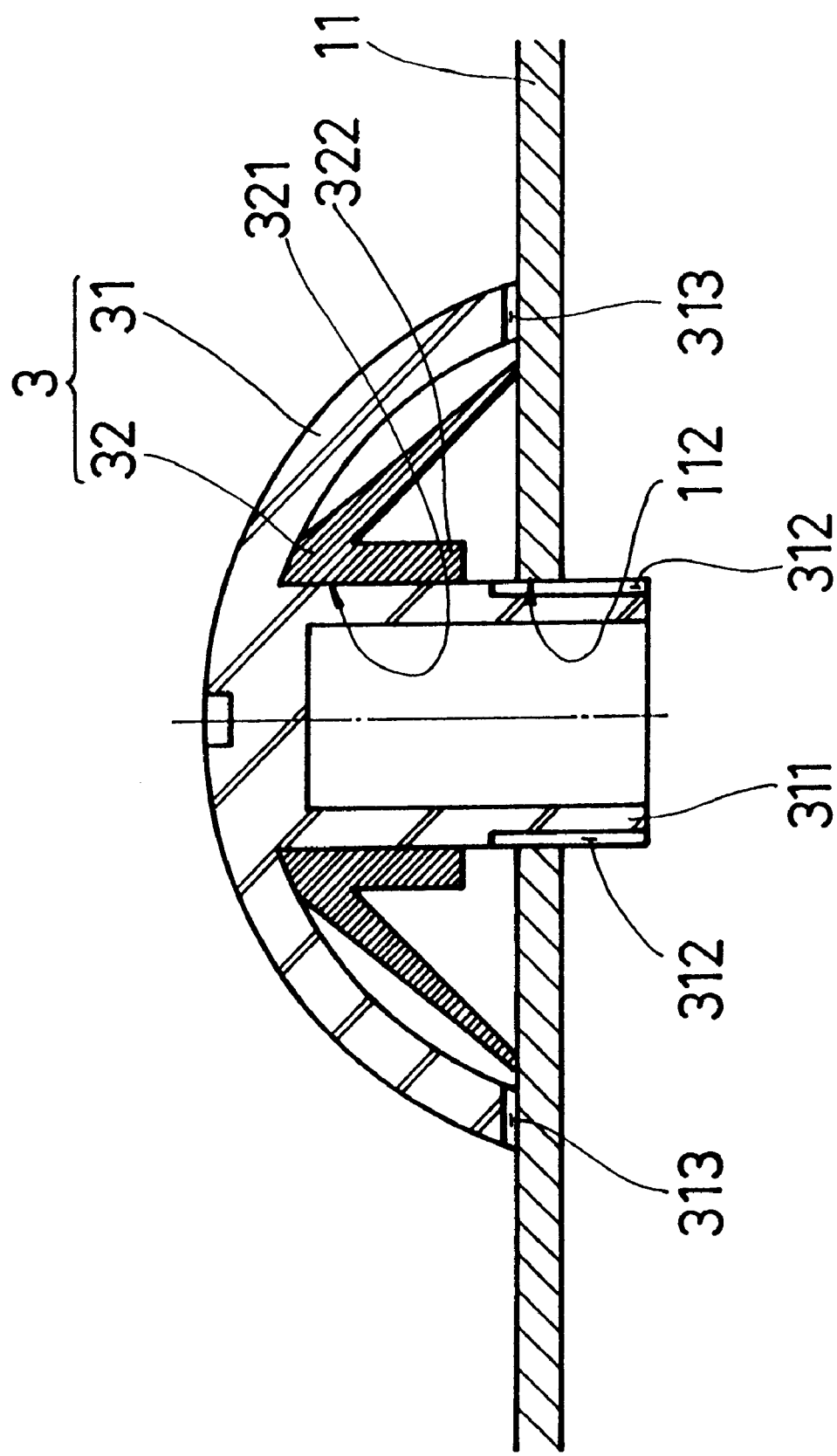
F I G. 6

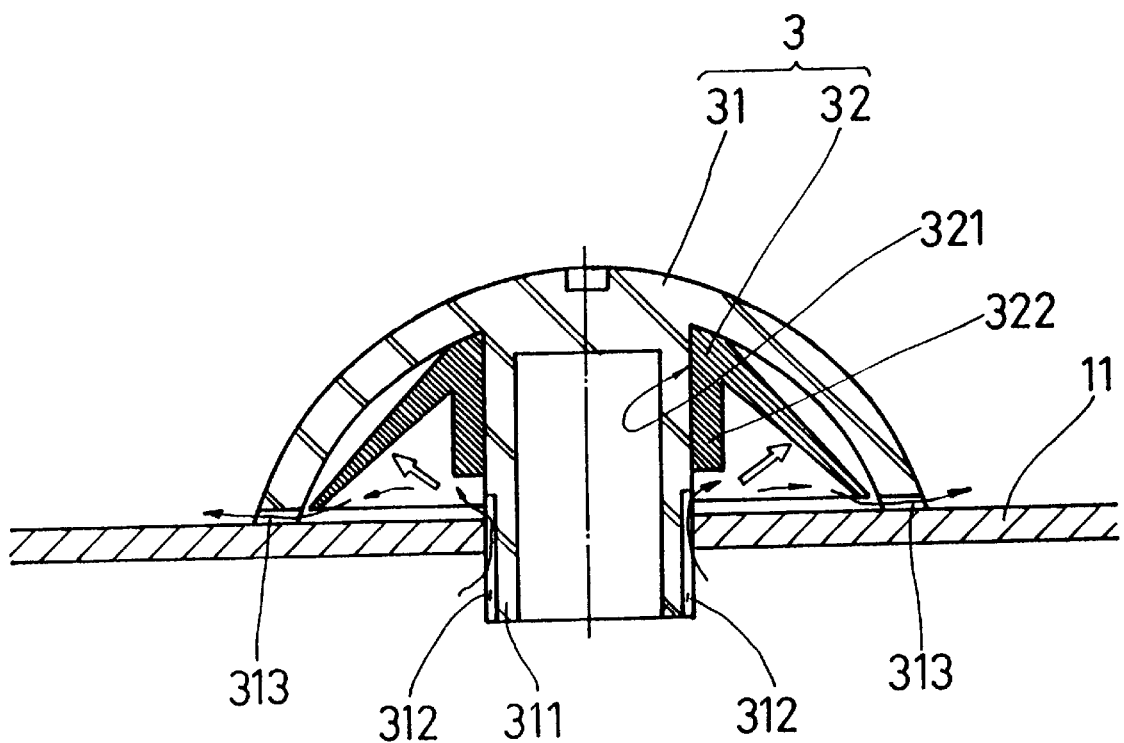
F I G. 8

FISHING BOX

BACKGROUND OF THE INVENTION

The present invention relates to a fishing box. More particularly, the present invention relates to a fishing box which has an air inflation device to provide fresh air.

A conventional creel does not receive water. Fish will die quickly. A box can receive water. However, fresh air cannot enter the box continuously while the box is closed.

SUMMARY OF THE INVENTION

An object of the present invention is to provide a fishing box which has an air inflation device to provide fresh air.

Another object of the present invention is to provide a fishing box which has a plurality of compartments to receive fishing tackles.

Accordingly, a fishing box comprises an outer casing, an inner casing disposed in the outer casing, a casket set having a plurality of caskets and a hollow seat disposed on the inner casing, a handle disposed on the hollow seat, an air inflation device disposed in the outer casing, an air channel, and a plurality of air inlet valves communicating with the air channel. The outer casing has an opening receiving a plurality of separation plates to define a cell chamber and a plurality of separated chambers. A plurality of snap bars are disposed on an upper periphery of the outer casing. Each of the snap bars engages with a snap fastener. A pair of door plates are disposed on the outer casing covering the opening of the outer casing. Each of the door plates has a grip, and a notch receiving the air inflation device. The hollow seat has a plurality of separated recesses receiving the caskets. A positioning plate is disposed on a top portion of the hollow seat. Two round holes are formed on two ends of the positioning plate. The handle has two pivot ends inserted in the round holes. A plurality of click bars are disposed on a lower periphery of the hollow seat. Each of the click bars engages with the respective snap fastener. Each of the caskets has a compartment, an insertion groove, and an upper cover. Each upper cover has a click block inserted in the respective insertion groove. The air channel is defined between a bottom plate of the inner casing and a bottom panel of the outer casing. The air inflation device communicates with the air channel. The bottom plate of the inner casing has a plurality of through apertures receiving the air inlet valves.

BRIEF DESCRIPTION OF THE DRAWINGS

FIG. 6 is an enlarged view of an air inlet valve;

FIG. 8 is a schematic view illustrating an application of an air inlet valve.

DETAILED DESCRIPTION OF THE INVENTION

Figure 1:
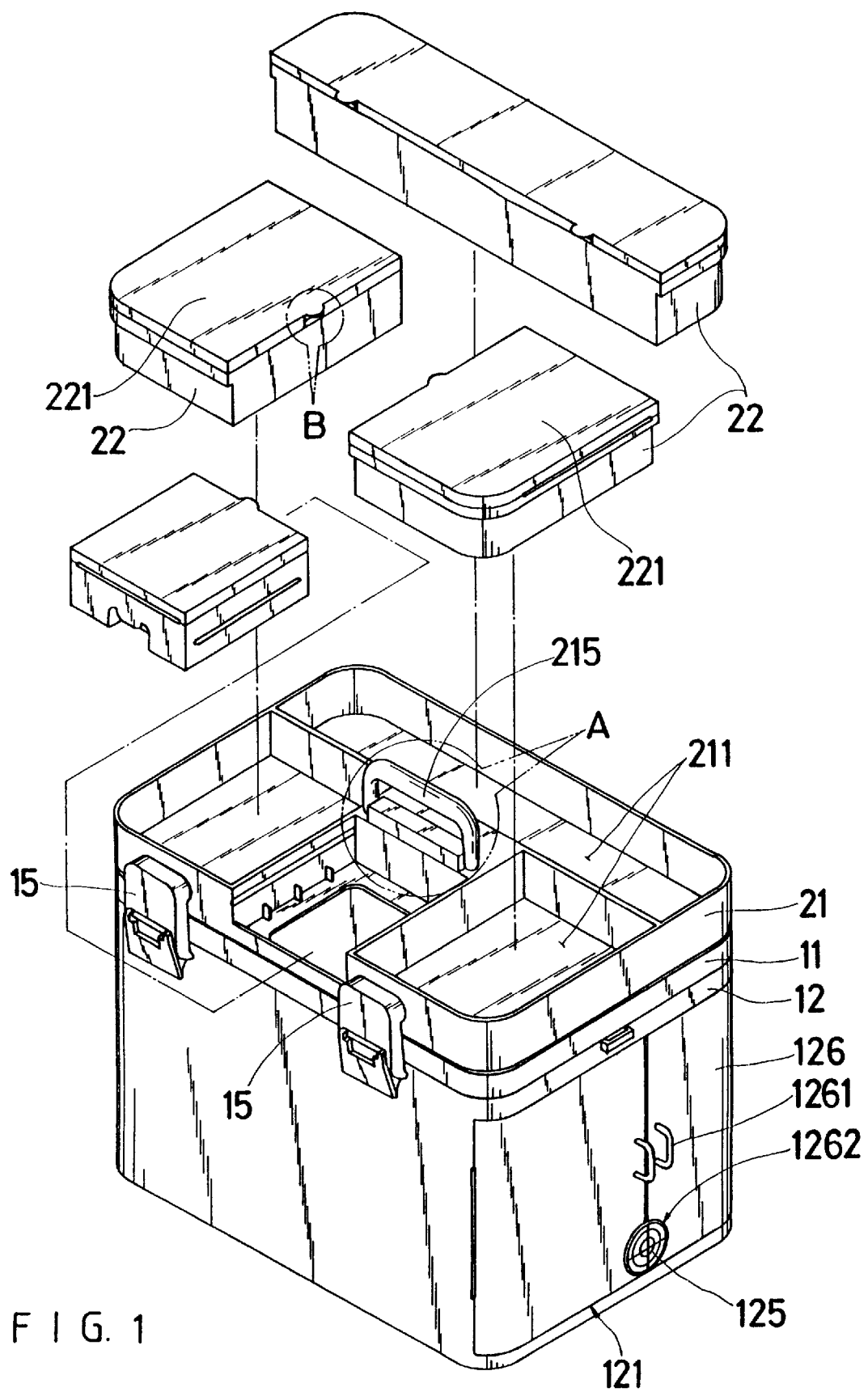
FIG. 1 is a perspective exploded view of a fishing box of a preferred embodiment in accordance with the present invention.
Figure 2:
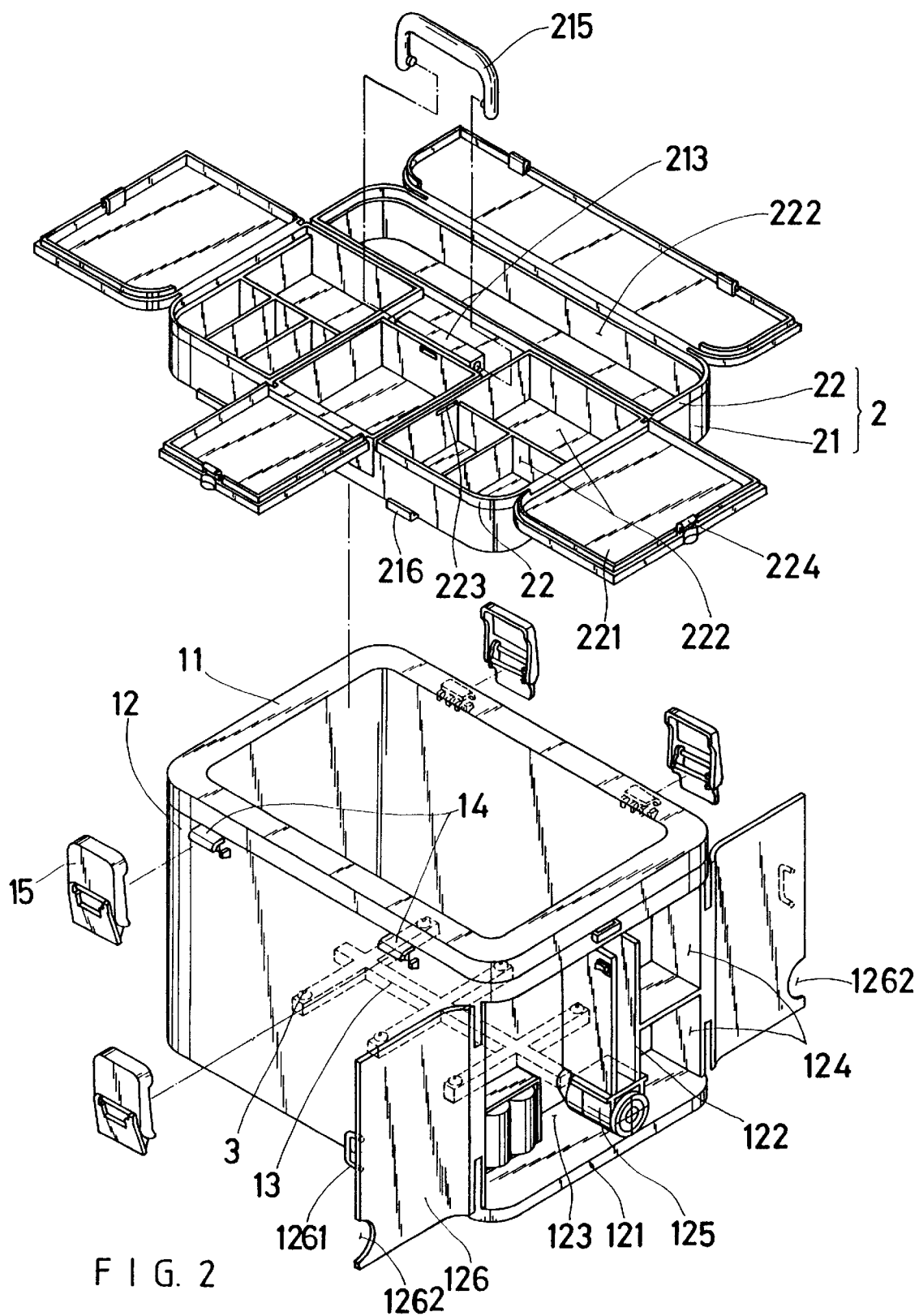
FIG. 2 is another perspective exploded view of a fishing box of a preferred embodiment in accordance with the present invention.
Figure 3:
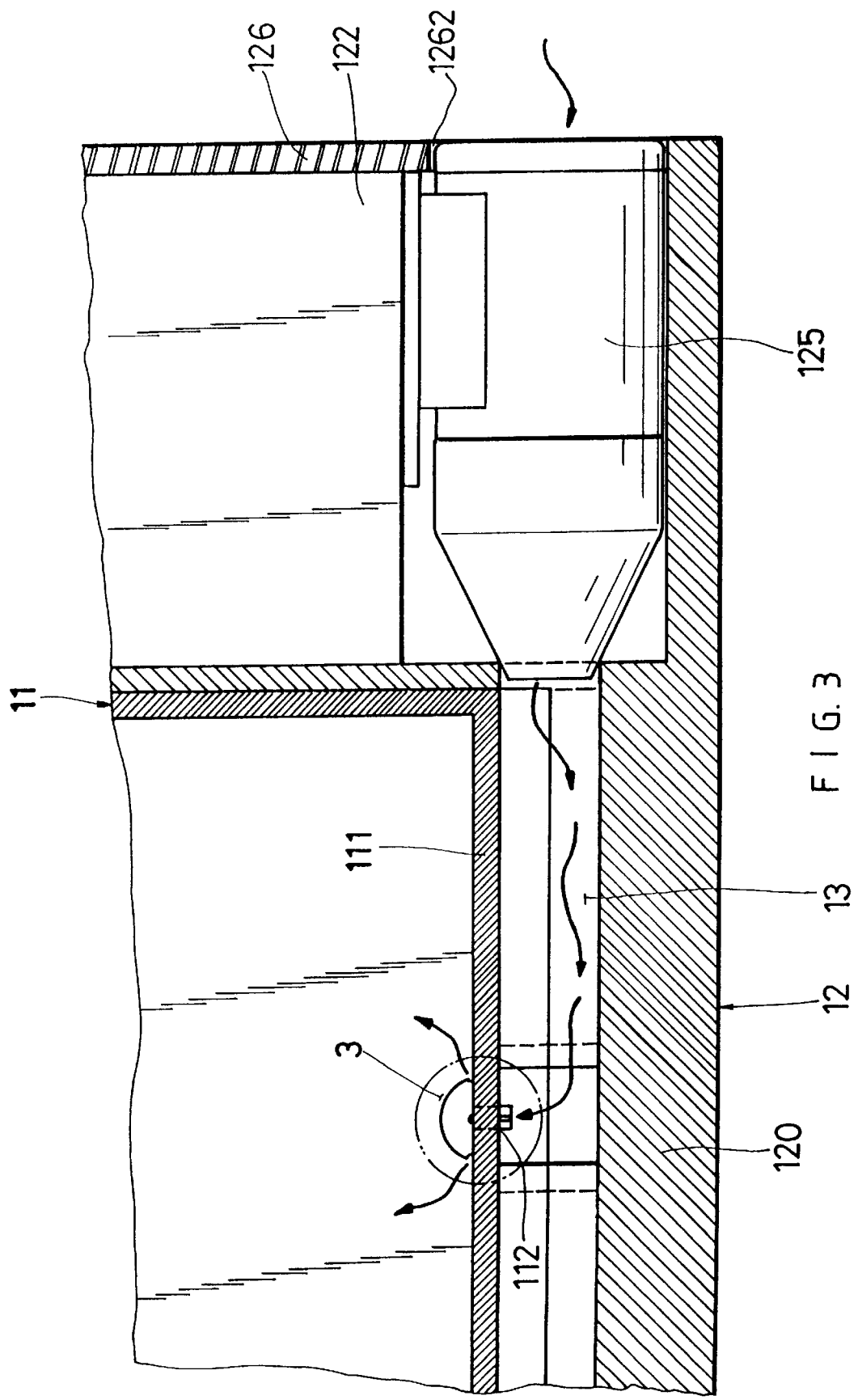
FIG. 3 is a schematic view illustrating an operation of an air inflation device and an air inlet valve.
Figure 4:
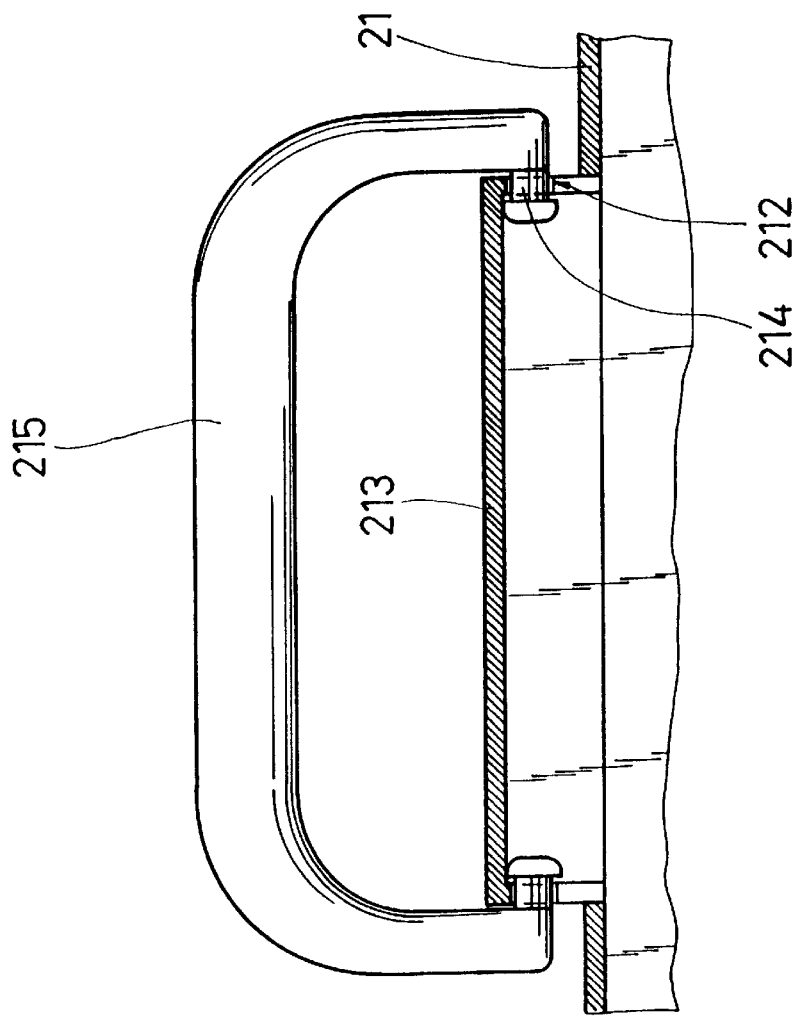
FIG. 4 is an enlarged view of a handle.
Figure 5:
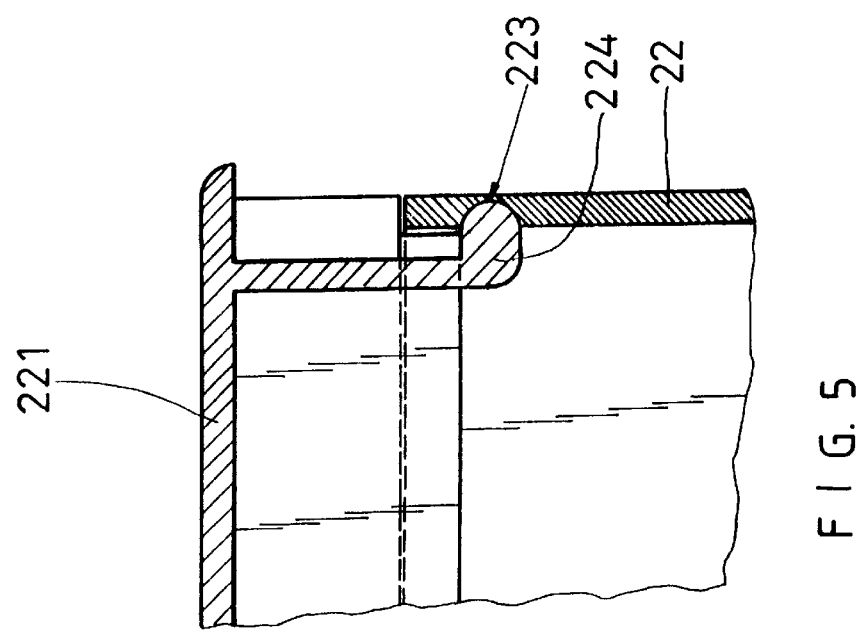
FIG. 5 is a schematic view illustrating a cover covering a casket.
Figure 7:
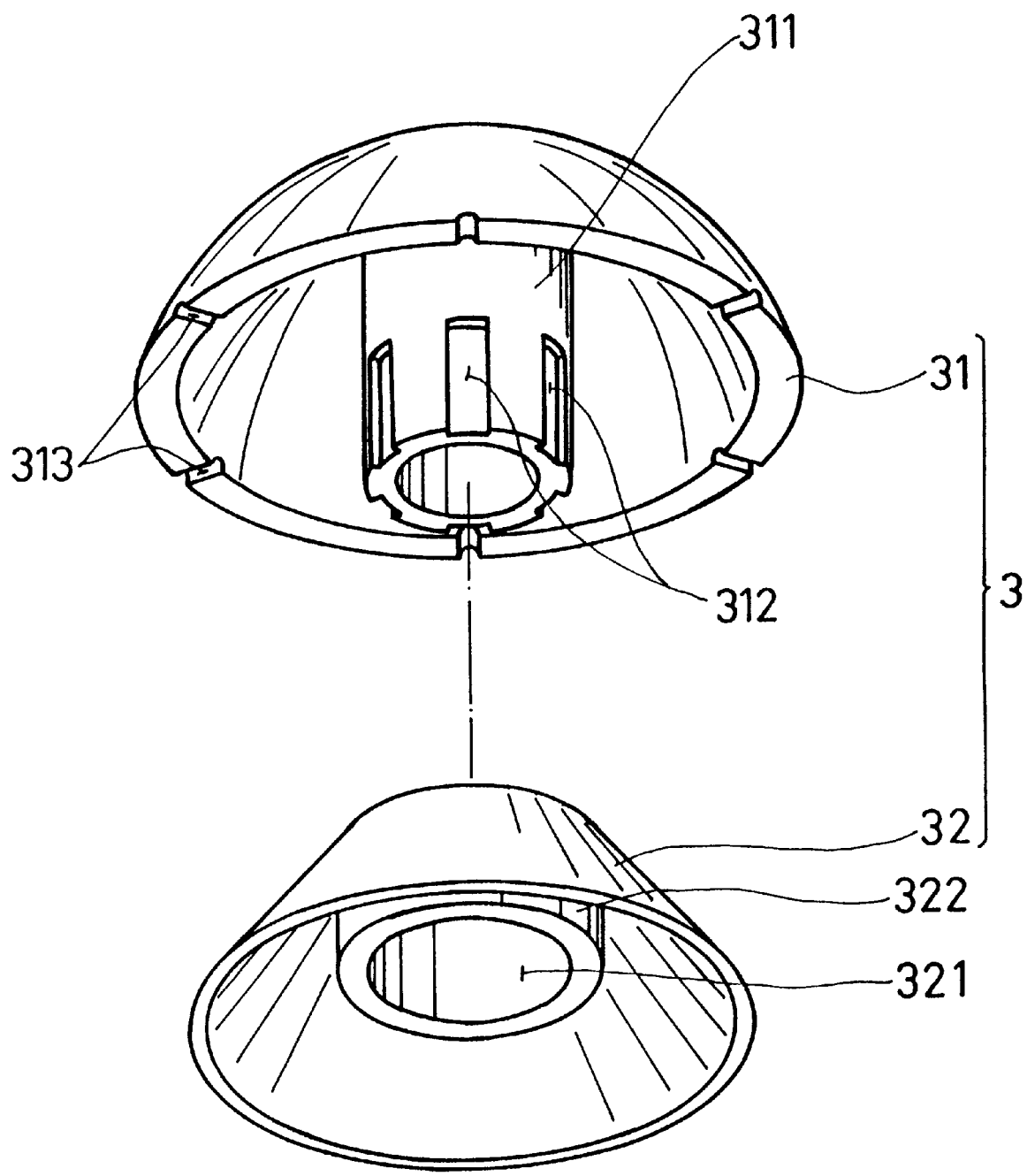
FIG. 7 is a perspective exploded view of an air inlet valve.

Referring to FIGS. 1 to 8, a fishing box comprises an outer casing 12, an inner casing 11 disposed in the outer casing 12, a casket set 2 having a plurality of caskets 22 and a hollow seat 21 disposed on the inner casing 11, a handle 215 disposed on the hollow seat 21, an air inflation device 125 disposed in the outer casing 12, an air channel 13, and a plurality of air inlet valves 3 communicating with the air channel 13.

The outer casing 12 has an opening 121 receiving a plurality of separation plates 122 to define a cell chamber 123 and a plurality of separated chambers 124.

A plurality of snap bars 14 are disposed on an upper periphery of the outer casing 12. Each of the snap bars 14 engages with a snap fastener 15.

A pair of door plates 126 are disposed on the outer casing 12 covering the opening 121 of the outer casing 12. Each of the door plates 126 has a grip 1261, and a notch 1262 receiving the air inflation device 125.

The hollow seat 21 has a plurality of separated recesses 211 receiving the caskets 22. A positioning plate 213 is disposed on a top portion of the hollow seat 21. Two round holes 212 are formed on two ends of the positioning plate 213. The handle 215 has two pivot ends 214 inserted in the round holes 212. A plurality of click bars 216 are disposed on a lower periphery of the hollow seat 21. Each of the click bars 216 engages with the respective snap fastener 15.

Each of the caskets 22 has at least a compartment 222, an insertion groove 223, and an upper cover 221. Each upper cover 221 has a click block 224 inserted in the respective insertion groove 223.

The air channel 13 is defined between a bottom plate 111 of the inner casing 11 and a bottom panel 120 of the outer casing 12.

The air inflation device 125 communicates with the air channel 13.

The bottom plate 111 of the inner casing 11 has a plurality of through apertures 112 receiving the air inlet valves 3.

Each of the air inlet valves 3 has a cone-shaped ring 32 and an upper housing 31. The cone-shaped ring 32 has an inner collar 322 and a center through hole 321. The upper housing 31 has a center hollow post 311 and a plurality of outlet grooves 313. A plurality of vent grooves 312 are formed on the center hollow post 311. The center hollow post 311 is inserted through the center through hole 321.

When the air inflation device 125 is operated, the fresh air will enter the air channel 13, the air inlet valves 3, and the inner casing 11.

The invention is not limited to the above embodiment but various modification thereof may be made. Further, various changes in form and detail may be made without departing from the scope of the invention.

I claim:

1. A fishing box comprises:
   an outer casing,
   an inner casing disposed in the outer casing,
   a casket set having a plurality of caskets and a hollow seat disposed on the inner casing,
   an air inflation device disposed in the outer casing,
   the outer casing having an opening receiving a plurality of separation plates to define a cell chamber and a plurality of separated chambers,
   a plurality of snap bars disposed on an upper periphery of the outer casing,
   each of the snap bars engaging with a snap fastener,
   a pair of door plates disposed on the outer casing covering the opening of the outer casing, each of the door plates having a grip, and a notch receiving the air inflation device, the hollow seat having a plurality of separated recesses receiving the caskets, a positioning plate disposed on a top portion of the hollow seat, two round holes formed on two ends of the positioning plate, the handle having two pivot ends inserted in the round holes, a plurality of click bars disposed on a lower periphery of the hollow seat, each of the click bars engaging with the respective snap fastener, each of the caskets having at least a compartment, an insertion groove, and an upper cover, each said upper cover having a click block inserted in the respective insertion groove, an air channel defined between a bottom plate of the inner casing and a bottom panel of the outer casing, a plurality of air inlet valves communicating with the air channel, the air inflation device communicating with the air channel, and the bottom plate of the inner casing having a plurality of through apertures receiving the air inlet valves.

2. The fishing box as claimed in claim 1, wherein each of the air inlet valves has a cone-shaped ring and an upper housing, the cone-shaped ring has an inner collar and a center through hole, the upper housing has a center hollow post and a plurality of outlet grooves, a plurality of vent grooves are formed on the center hollow post, and the center hollow post is inserted through the center through hole.

* * * * *